United States Patent [19]
Malm

[11] Patent Number: 5,409,653
[45] Date of Patent: Apr. 25, 1995

[54] METHOD OF FORMING STRIP PRODUCTS FROM THEREMOPLASTIC MATERIALS

[75] Inventor: Douglas N. Malm, Brecksville, Ohio

[73] Assignee: The Standard Products Company, Cleveland, Ohio

[21] Appl. No.: 87,961

[22] Filed: Jul. 6, 1993

Related U.S. Application Data

[63] Continuation of Ser. No. 806,728, Dec. 12, 1991, abandoned, which is a continuation-in-part of Ser. No. 787,837, Nov. 5, 1991, Pat. No. 5,171,499.

[51] Int. Cl.$^6$ ............................................. B29C 47/02
[52] U.S. Cl. ................................. 264/146; 156/244.12; 156/244.18; 264/151; 264/178 R; 264/210.2; 264/177.17; 264/177.19; 264/177.20; 425/327; 425/377
[58] Field of Search ............... 264/171, 146, 145, 151, 264/178 R, 210.2, 177.10, 177.16–177.20; 425/327, 382.3, 363, 377, 308; 156/244.12, 244.18

[56] References Cited

U.S. PATENT DOCUMENTS

| | | | |
|---|---|---|---|
| 3,608,035 | 9/1971 | Frohlich | 264/146 |
| 3,917,787 | 11/1975 | Hansen | 264/146 |
| 4,097,634 | 6/1978 | Bergh | 264/171 |
| 4,167,431 | 9/1979 | Wong | 264/178 R |
| 4,318,764 | 3/1982 | Van Manen | 264/177.17 |
| 4,563,320 | 1/1986 | Morgan | 425/363 |
| 4,849,045 | 7/1989 | Schmidt | 264/178 R |
| 5,171,499 | 12/1992 | Cehelnik et al. | 264/177.19 |

FOREIGN PATENT DOCUMENTS

| | | | |
|---|---|---|---|
| 2113984 | 10/1972 | Germany | 264/177.19 |
| 2527125 | 12/1976 | Germany | 264/148 |
| 57-207038 | 12/1982 | Japan | 264/151 |
| 1186211 | 4/1970 | United Kingdom | 264/171 |

Primary Examiner—Jeffery R. Thurlow
Attorney, Agent, or Firm—Harness, Dickey & Pierce

[57] ABSTRACT

A method of forming an elongated trim strip product by extruding a first strip of thermoplastic material from a die having an outlet with an area at least substantially as great as the desired cross-sectional area of the strip product in planes perpendicular to the direction of extrusion. Immediately subsequent to the step of extruding and while the extruded strip is still in a plastic state, it is passed longitudinally between cooperating forming rolls to shape the cross section of the extruded strip to the desired shape and cross section of the strip product. While the extruded strip is passing between the cooperating forming rolls, a backing strip of foil or thin metal is directed between the rolls in alignment with the extruded strip to bond the backing strip to the extruded strip. In a second embodiment, one or more cables of high strength flexible material, such as metal wire, are joined to or embedded in the extruded strip during the extrusion process to function as a pulling mechanism for moving the extruded strip through a cooling bath without stretching or deforming the extruded strip. After cooling, the cables can be severed from the strip if desired.

12 Claims, 3 Drawing Sheets

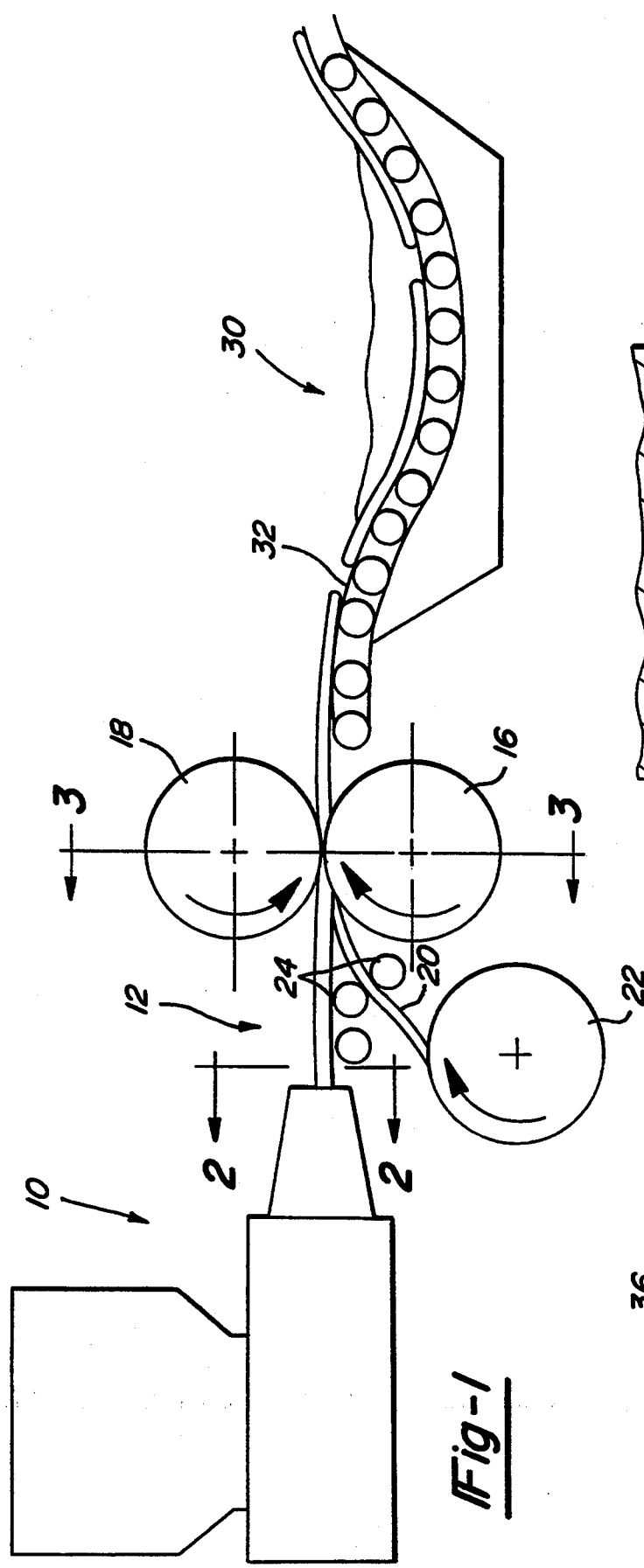
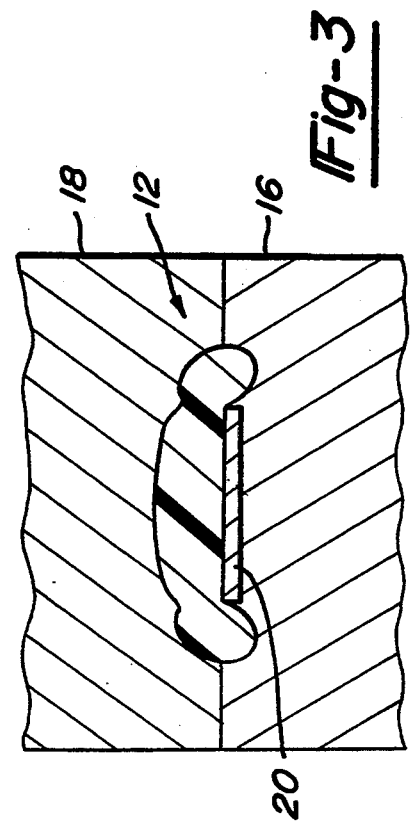
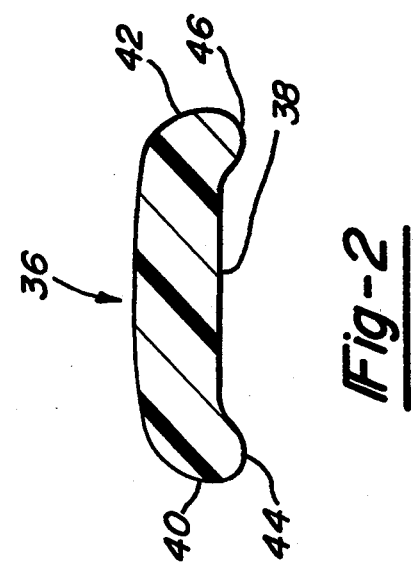

METHOD OF FORMING STRIP PRODUCTS FROM THEREMOPLASTIC MATERIALS

This is a continuation of U.S. patent application Ser. No. 806,728, filed Dec. 12, 1991, now abandoned, which is a continuation in part of Ser. No. 787,837, filed Nov. 5, 1991, now U.S. Pat. No. 5,171,499.

BACKGROUND OF THE INVENTION

The subject invention is directed toward the art of plastic forming and, more particularly, to a method of forming strip-like products from thermoplastic materials.

The invention is especially suited for forming trim strips and decorative strip components for vehicle bodies and will be described with particular reference thereto; however, as will become apparent, the invention is capable of broader application and could be used for forming a variety of strip-like products from thermoplastic materials.

Decorative and protective trim strips formed from thermoplastic materials are in widespread use in the automotive industry. The strips have been formed by both injection molding and extrusion processes. Both of these processes have certain disadvantages which make them less than ideal for high volume, high speed production of such strip products. For example, when injection molding such strip products, the effective rate of production is closely tied to the number of die cavities available. Moreover, dies for such products are relatively cumbersome and expensive. Additionally, the cycle time for such products tends to be relatively long because the strip products are flexible and very difficult to remove from the mold cavities and handle without damage until after they have cooled significantly.

Different but equally difficult problems are encountered when attempting to extrude such strip products. First, the use of the extruding process is generally limited to products of uniform cross section throughout their length. Secondly, it is very difficult to handle the extruded product and move it through the necessary cooling bath without deforming it and rendering it unsuitable for use. In addition to the above, the end shapes and contours of extruded products are limited to what can be accomplished by simple cutting operations.

BRIEF DESCRIPTION OF THE INVENTION

The subject invention overcomes the above-discussed problems and disadvantages and provides a greatly improved method for producing strip-type products from thermoplastic materials. In accordance with the invention, the method comprises extruding a first strip of thermoplastic material from a die having an outlet with the general shape of the desired strip in planes perpendicular to the axis of extrusion. Immediately subsequent to the step of extruding, and while the extruded-strip is still in a plastic state, it is passed longitudinally between cooperating forming rolls having an external shape and contour to form the first extruded strip to its final desired shape and cross section. Additionally, during the extruding and forming steps, a flexible cable of high strength material is joined along a longitudinal edge of the extruded strip and used for applying conveying forces to the strip for subsequent processing such as cooling or the like.

By using the forming rolls while the extruded strip is still in a warm plastic state, it is possible to form the extruded strip into its desired final shape with the possibility existing of providing varying cross sections longitudinally of the strips merely by changing the surface formation of the forming rolls. Additionally, by bonding the flexible cable to the extruded strip, the extruded strip can be readily handled and pulled through subsequent cooling baths and the like.

Preferably, and in accordance with a more limited aspect, the flexible cable is connected to the extruded strip by a thin web of thermoplastic which can be readily severed after completion of the cooling or other final processing steps.

In accordance with a further aspect of the invention, the extruded strip can be cut to length simultaneously with its passage through the forming rolls. That is, the forming rolls can have their surface contours such that the end shape of the strip product is formed and cut to length. Additionally, as opposed to a conventional extruded product, the end shapes can be contoured.

In accordance with another aspect of the invention, the invention provides a method of forming an elongated trim strip having a predetermined cross-sectional configuration transversely of its longitudinal axis. The method generally comprises extruding a first strip of hot molten thermoplastic material from a die having an outlet corresponding to the desired predetermined cross-sectional configuration. Subsequent to the extruding step and prior to significant cooling of the extruded strip, a length of flexible metal cable is joined continuously along a longitudinal edge of the extruded strip. Thereafter, the extruded strip is conveyed through a cooling bath by applying pulling forces to the cable; and, after passing through the cooling bath, the cable is severed from the strip.

In accordance with yet another aspect of the invention, the first strip can be formed by a co-extrusion process to provide a multi-layered extrusion. This allows the resulting product to have an outer skin of one color and an inner body portion of a second color. Alternatively, plastics having different physical characteristics can be bonded to provide a final strip with differing properties at transverse points within it.

As can be seen from the foregoing, a primary object of the invention is the provision of an improved method for forming elongated thermoplastic strip members.

Yet another object of the invention is the provision of a method which allows high speed production of strip-like products from thermoplastic materials through the use of conventional extruding and roll forming techniques.

A still further object is the provision of a method of the type described which can be used to produce multi-layered strip products having cross-sectional variations along their length.

An additional object is the provision of a method of the type described which allows the formation of thermoplastic trim strip products without inducing stresses in the products or causing the strips to deform during the processing.

BRIEF DESCRIPTION OF THE DRAWINGS

The above and other objects and advantages will become apparent from the following description when read in conjunction with the accompanying drawings wherein:

FIG. 1 is a side elevational view in diagrammatic form illustrating the general sequence of processing steps of the subject invention;

FIG. 2 is a cross-sectional view of the extruded strip immediately prior to the forming rolls (the view is taken at line 2—2 of FIG. 1);

FIG. 3 is a cross-sectional view through the strip and the forming rolls (the view is taken at line 3—3 of FIG. 1);

DETAILED DESCRIPTION OF THE PREFERRED AND ALTERNATE EMBODIMENTS

Referring in particular to FIGS. 1 through 4, the overall arrangement and sequence of processing of the subject invention can be most clearly understood. As illustrated in FIG. 1, the invention is generally concerned with forming elongated, strip-like products from any suitable thermoplastic material such as a flexible polyvinyl chloride, a thermoplastic olefin or a thermoplastic urethane. Obviously, those skilled in the art will become aware of other materials which could equally well be used as the description proceeds.

In particular, FIG. 1 shows a conventional screw-type extruding machine 10 which is arranged to produce a first strip 12 having a predetermined desired cross-sectional shape which is of the same general shape as the desired final cross section of the strip which is ultimately to be produced. As will subsequently become apparent, the actual shape of the extruded strip can vary substantially from the final shape, but should preferably be at least as great in total cross-sectional area as the maximum cross-sectional area of the final strip product.

Figure 5:
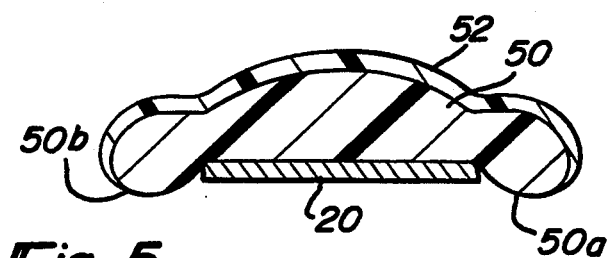
FIG. 5 is a cross-sectional view taken on line 5—5 of FIG. 4.

After exiting from the extruder, the strip is suitably supported by a roll conveyor or table and fed directly to a pair of opposed forming rolls 16 and 18 which are positioned with their axes of rotation extending perpendicular to the direction of movement of the strip element. The forming rolls 16 and 18 are driven in synchronized relationship and have a cooperating outer surface configuration which is arranged to form the strip product to its desired final cross-sectional configuration. As can be appreciated, the rolls have a surface contour and mate to form the first extruded strip to the desired final cross-sectional configuration which can be varied longitudinally along the strip product. For example, as illustrated in FIG. 5, the strip can vary from a relatively wide area at one end to a somewhat narrower shape at the trailing end. The cross section along this strip can be as illustrated in FIG. 3, for example.

Simultaneously with the passage of the extruded strip through the forming rolls 16 and 18, a strip of thin metal backing material 20 is fed into position between one side of the extruded strip and the corresponding rolls 16 or 18. In the FIG. 1 showing, a thin strip of aluminum 20 of perhaps 0.010 to 0.020 inches in thickness is fed from a reel 22 through a pair of cooperating rolls 24 to a position beneath the extruded strip and above the forming roll 16. The strip 20 is maintained in alignment with the extruded strip and is bonded thereto during passage between the forming rolls 16, 18. The actual bonding of the strip 20 to the extruded strip 12 can be, of course, improved by the use of various surface treatments on the strip if desirable or necessary.

The backing strip 20 acts to reinforce the resulting strip product and, in many product types, serves as a mounting means for connecting the resulting product to the associated vehicle body panels and the like. In the FIG. 1 showing, the backing strip 20 provides means for conveying the formed strip product through a subsequent cooling bath 30. In this showing, the bath 30 is merely a water bath through which the strip products are conveyed from the forming rolls 16 and 18 by a suitable belt-type conveyor apparatus 32. It should be appreciated that any of a variety of types of conveying or pulling devices could be used for engaging the metal backing strip 20 and propelling the formed products to or through any of various types of cooling apparatus.

Figure 4:
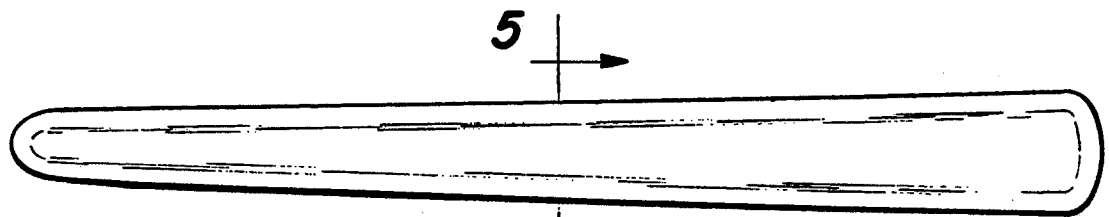
FIG. 4 is a plan view of a typical strip product which can be formed with the subject invention.

FIGS. 2 and 3 generally illustrate an example type extruded strip and resulting product cross section. In FIG. 2, the extruded strip is shown as having a somewhat convex upper surface and a generally flat lower surface 38. The lateral edges 40, 42 are rounded and downwardly extending bead-like protrusions 44 and 46 extend along edges 40, 42, respectively. This provides general alignment for the receipt of the metal strip 20 and, as shown in FIG. 3, the strip can be sized to mate within the flat space between beads 44 and 46. The FIG. 4 showing illustrates the cross-sectional area and shape of forming rolls at the location at which the FIG. 3 cross section is formed. As illustrated therein, the FIG. 2 cross section is refined to the desired final cross section through the shaping of the forming rolls, and the beads 44 and 46 are further formed by roll 16 to the point where they extend below the lower surface of the aluminum backing strip 20. This shape can thereafter be mechanically cut to remove the beads to a level corresponding to the level of the surface of the backing strip 20. In many instances, the mechanical cutting of the formed surface of the strip allows the strip to better conform to the surface to which it is to be attached and to provide a sharp, clean peripheral edge corner which cannot always be obtained during the roll forming operation.

Figure 6:
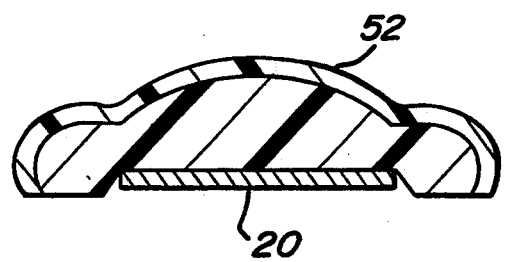
FIG. 6 is a view like FIG. 5 but showing the product after a final mechanical treatment step.

FIG. 5 shows an alternative form for products which can be produced by the subject method. In FIG. 5, the main body of the strip is formed from a first thermoplastic material identified with the numeral 50. Through conventional co-extruding techniques, a surface layer 52 of a differing thermoplastic material can be simultaneously extruded over the core strip 50 prior to the passage of the extruded strip through the forming rolls 16, 18. This formed strip with the aluminum backing 20 can subsequently be mechanically cut or shaped to remove the tab portions 50a and 50b to provide the smooth planar back illustrated in FIG. 6 and discussed in general terms with reference to the FIG. 3 product.

As shown in FIG. 5, the strip products formed by the invention can have contoured ends and cut to length by the forming rolls 16, 18. Merely by proper shaping of the forming rolls, a severing portion can be inserted into the rolls so that the products are cut to discrete lengths and shapes during rotation of the rolls.

Figure 7:
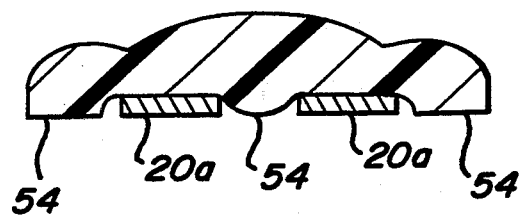
FIG. 7 is a cross-section through a modified form of strip.

FIG. 7 shows a modified form of strip possible with the invention. In this form, two backing strips 20a are bonded to the back between formed bead-like portions 54. Alternatively, perforated backing strips could also be used.

Under certain conditions and for certain uses, the backing strips could be in the form of a thin film of metal or other material capable of withstanding the temperature of the extrudate. In any event, the material selected for the backing strip should be chemically compatible with the extrudate and should also have the physical characteristics to provide the necessary strength for pulling the extruded strip through the cooling bath and to allow subsequent handling, mounting, and use of the thin strips.

Figure 8:
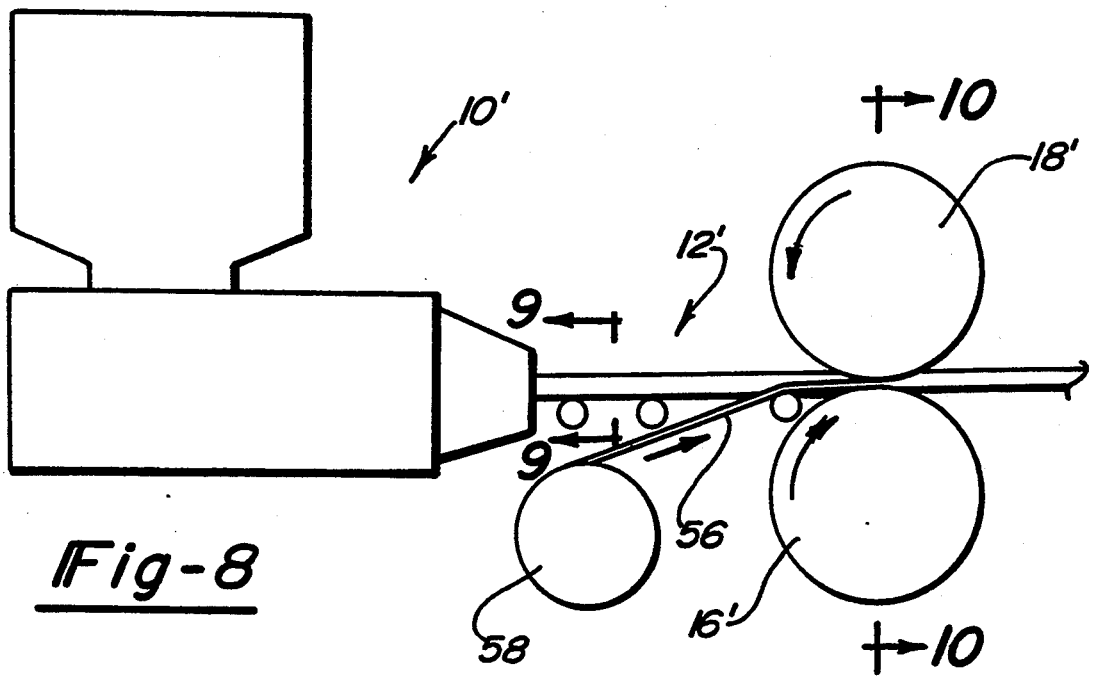
FIG. 8 is a view similar to FIG. 1 but showing a modified form of the invention.
Figure 9:
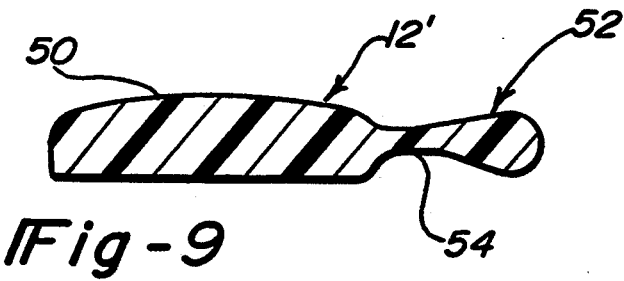
FIG. 9 is a cross-sectional view taken on line 9—9 of FIG. 8.
Figure 10:
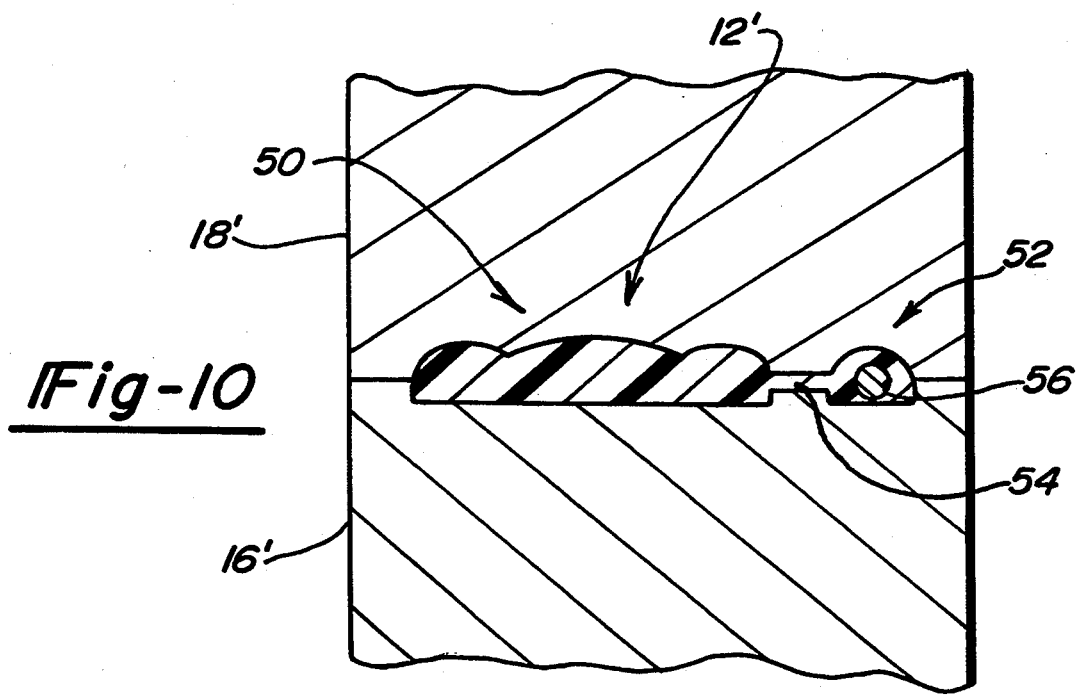
FIG. 10 is a cross-sectional view taken on line 10—10 of FIG. 8.

FIGS. 8 through 10 illustrate a further embodiment of the invention wherein a thin, flexible cable member is incorporated into the extruded strip to provide a means for conveying the strip during various processing steps without deforming or stretching the extruded strip. In the FIGS. 8 through 10 embodiment, like reference numerals have been used to identify the same or similar items corresponding to these of the FIGS. 1 through 7 embodiment. In the FIGS. 8 through lid embodiment, however, these numerals are differentiated by the addition of a prime suffix. In the FIGS. 8 through 10 embodiment, the extruded strip 12' is passed between forming rolls 16' and 18' which act to reduce the extruded cross-section to its final desired shape. As can be appreciated from the foregoing discussion with reference to the FIGS. 1 through 7 embodiment, the actual extruded shape could have a variety of specific configurations. In the FIGS. 8 through 10 embodiment, the exemplary shape is shown in FIG. 9 and includes a main body section 50 which is sized and shaped to generally correspond at least in overall size and configuration to the final desired cross-section of the finished trim strip ultimately desired. Associated with and joined to the main body section 50 is a somewhat smaller section 52 which is preferably connected to the body section 50 by a relatively thin web 54.

The extruded strip form shown in FIG. 9 is passed between the forming rolls 16' and 18' to reduce it to its desired final configuration. The forming rolls 16' and 18' can be formed as previously discussed with reference to FIGS. 1 through 7 embodiment. That is, they can be formed to shape the body of the trim strip into individual precut lengths having a desired end configuration of the form shown in FIG. 4. Alternatively, the forming rolls can be formed to merely form a continuous trim strip without preformed ends. In any event, as the strip 12' passes between the rolls 16' and 18', a relatively small diameter, high strength flexible cable 56 is fed from a reel 58 to a position between the rolls 16' and 18'. As illustrated in FIG. 10, the cable 56 is entered into the rolls at a location to join with the extruded section 52. In this regard, the rolls 16' and 18' force the body section 50 to its desired final configuration and the web 54 is thinned somewhat as the cable 56 is embedded into the section 52.

As is apparent from the foregoing, the cable 56 is connected continuously along the lateral edge of the main body of the formed trim strip 12'. That is, the web 54 acts to connect the cable to the body of the trim strip and the trim strip can thus be moved from the rolls by applying tension forces to the cable 56. Thus, forces used to move the trim strip through the cooling and subsequent processing steps do not have to be applied to the strip longitudinally thereof. Rather, they are applied uniformly from the cable through the thin web section to move the strip without placing it under a longitudinal tension.

After the completion of the cooling and subsequent processing steps, the web 54 can be severed to remove the cable 56 and the extruded portion 52 from the finished trim strip body section 50.

It is contemplated that the cable 56 could be applied to the extruded trim strip in a variety of ways other than by the direct rolling in process illustrated in FIG. 8. For example, if desired, the cable 56 could be passed directly into the extrusion head and die to emerge therefrom simultaneously with the extrudate. That is, the cable would be in position as the material exited from the extrusion die. In such case, continuous lengths of trim strip in their final cross-section could be directly extruded from the extruder and the forming roll step dispensed with. In this situation, however, an individual formed end lengths of trim strip could not be formed. In addition, the cable could be used in conjunction with the flat permanent backing strip discussed in the FIGS. 1 through 7 embodiment. In any event, the use of the cable facilitates the processing and further handling of the trim strip and can be readily removed because it is connected to the extruded body by a relatively thin web.

As can be appreciated, alternative locations for the cable 56 could be provided. Additionally, plural cables could be used with a single trim strip or a single cable could be used between two separate main trim strip bodies.

The invention has been described in great detail sufficiently wherein one of ordinary skill in the art can make and use the same. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A method of forming an elongated trim strip comprising the steps of:

extruding a first strip of thermoplastic material from a die having an outlet with an area at least substantially as great as the desired cross-sectional area of the strip in planes perpendicular to the direction of extrusion;

immediately subsequent to the step of extruding and while the extruded strip is still in a plastic state, passing the extruded strip longitudinally between cooperating forming rolls to form shape the cross section of the extruded strip to a desired shape and cross section;

while said strip is being extruded and its cross section formed, joining a length of flexible cable to extend longitudinal of the strip in a continuously bonded relationship thereto;

forming a web between said strip and flexible cable, said web adjacent said cable;

subsequently using the flexible cable to transfer the extruded and formed strip through a cooling bath; and severing the web and cable from the strip by cutting between the extruded strip and adjacent web thereby providing an edge portion on said strip where said web was connected.

2. The method as defined in claim 1 wherein the flexible cable is severed from the extruded and formed strip after completion of the cooling step.

3. The method as defined in claim 1 wherein the flexible cable is joined to the extruded strip by a thin web of thermoplastic material extruded simultaneously with said strip along an edge thereof.

4. The method as defined in claim 1 wherein the flexible cable is joined to the extruded strip prior to passing the strip through the cooperating forming rolls.

5. The method as defined in claim 1 wherein the flexible cable is joined to the extruded strip while the extruded strip is passing through the cooperating forming rolls.

6. The method as defined in claim 3 wherein said cable is joined along a longitudinal edge of the strip by thin web of thermoplastic which is severed from the strip after completion of passage through the cooling bath.

7. The method as defined in claim 6 including directing the cable into bonded relationship with the strip simultaneously with the step of extruding.

8. A method of forming an elongated trim strip having a predetermined cross-sectional configuration transversely of its longitudinal axis comprising the steps of:
   extruding a first strip of hot molten thermoplastic material from a die having an outlet corresponding to the desired predetermined cross-sectional configuration;
   subsequent to the extruding step and prior to significant cooling of the extruded strip joining a length of flexible metal cable continuously along a longitudinal edge of the extruded strip;
   forming a web between said strip and flexible cable, said web adjacent said cable;
   conveying the extruded strip through a cooling bath by applying pulling forces to the cable; and
   thereafter, severing the web and cable from the strip by cutting between the extruded strip and adjacent web thereby providing an edge portion on said strip where said web was connected.

9. The method as defined in claim 8 including the step of extruding a thin continuous web of material along a longitudinal edge of the strip and using the extruded web to join the cable to the strip.

10. The method as defined in claim 9 including the step of shaping the extruded strip to a final desired shape by applying forming rolls thereto prior to conveying the extruded strip through the cooling bath.

11. The method as defined in claim 10 wherein said cable is extruded into the thin continuous web.

12. A method of forming an elongated trim strip for a vehicle comprising the steps of:
   providing a thermoplastic material for extruding said trim strip, said thermoplastic material being extruded through an extrusion head and a die;
   providing a flexible cable, said flexible cable being passed through said extrusion head and said die such that said flexible cable emerges with said thermoplastic material, at least partially disposed within said thermoplastic material, thereby forming an extruded strip having a desired shape and cross section with said cable embedded therein;
   forming a web between said strip and flexible cable, said web adjacent said cable;
   subsequently using the flexible cable to transfer the extruded strip through a cooling bath;
   thereafter, severing the adjacent web and cable from the strip by cutting between the extruded strip and adjacent web thereby providing an edge portion on said strip where said web was connected.

* * * * *